United States Patent [19]

Gerry

[11] 4,365,186

[45] Dec. 21, 1982

[54] HIGH ENERGY MODULATION IGNITION SYSTEM

[76] Inventor: Martin E. Gerry, 13452 Winthrope St., Santa Ana, Calif. 92705

[21] Appl. No.: 212,493

[22] Filed: Dec. 3, 1980

Related U.S. Application Data

[63] Continuation-in-part of Ser. No. 46,569, Jun. 7, 1979, Pat. No. 4,292,569, and Ser. No. 923,828, Jul. 12, 1978, Pat. No. 4,216,412.

[51] Int. Cl.³ .................... H05B 37/02; H05B 39/04; H05B 41/36
[52] U.S. Cl. .................... 315/209 R; 123/169 MG; 123/608; 123/620; 123/621; 315/171; 315/176
[58] Field of Search ................ 315/139, 141, 45, 171, 315/172, 176, 209; 123/169 MG, 608, 620, 621, 655

[56] References Cited

U.S. PATENT DOCUMENTS

| | | | |
|---|---|---|---|
| 3,972,315 | 8/1976 | Munden et al. | 315/171 |
| 3,974,412 | 8/1976 | Pratt, Jr. | 313/139 |
| 4,033,316 | 7/1977 | Birchenough | 315/176 |
| 4,041,922 | 8/1977 | Abe et al. | 123/169 MG |
| 4,087,719 | 5/1978 | Pratt, Jr. | 315/45 |
| 4,122,816 | 10/1978 | Fitzgerald et al. | 315/209 CD |
| 4,136,301 | 1/1979 | Shimojo et al. | 315/172 |
| 4,265,201 | 5/1981 | Gerry | 123/654 |
| 4,317,068 | 2/1982 | Ward et al. | 315/172 |

*Primary Examiner*—Saxfield Chatmon, Jr.

[57] ABSTRACT

An ignition system (51-59, 60, Ql, Qn, 30) providing high modulation energy by means of modulator (30) is used to fire an igniter and effect total fuel burning without detonation. An extremely long ignition arc is initiated at an optimum timing angle ($\theta°$) in advance of top dead center piston position. Such long arc with its high energy content makes possible an ignited fuel nodule of increased size within the combustion chamber of the engine. The increased fuel nodule size makes possible efficient engine operation at the variety of cylinder pressures and the variety of ignition voltages usable to ignite the fuel. These long arcs may be sustained over a large range of duty cycle periods of ignition electrical power by modulation of transient current feeding the igniter.

9 Claims, 3 Drawing Figures

HIGH ENERGY MODULATION IGNITION SYSTEM

CROSS REFERENCE TO RELATED APPLICATIONS

This application is a continuation-in-part of copending application Ser. No. 046,569 filed June 7, 1979 now U.S. Pat. No. 4,292,569, and its parent application Ser. No. 923,828 filed July 12, 1978 now Pat. No. 4,216,412 which was copending with Ser. No. 046,569 at time of filing same.

DESCRIPTION

1. Technical Field

This invention is in the field of ignition systems wherein high energy ignition power is used. Such systems contain modulation methods to make extremely high electrical energy possible.

2. Background Art

One disadvantage of the prior art systems is that none of such systems has the capability of delivering sufficient quantities of energy to fire an igniter so as to enable the igniter to cause all fuel in an engine cylinder chamber to be consumed.

Another disadvantage of the prior art ignition systems is the inability of such systems to develop long arcs across their igniter bases at optimum static timing angles.

Accordingly, such prior art systems do not use igniters that develop long arcs between their electrodes, nor are such long arcs initiated at critical static timing angles. Such failings in the prior art systems result in initiating only a small ignited fuel nodule which is insufficient in mass and area to cause an adequate flame front to be built up in the combustion chamber with consequent insufficient fuel usage efficiency and performance.

DISCLOSURE OF INVENTION

One objective of this invention is to provide a system which delivers high quantities of energy to fire an igniter and effect total fuel burning in the engine combustion chamber without detonation.

Another objective of this invention is to provide an igniter that will produce long ignition arcs at optimum static timing angles over the range of cylinder pressures that are encountered in various engines using different ignition voltages to initiate the desireable long arcs.

Still another objective of this invention is to enable a relatively large ignited fuel nodule to be initiated by the long electrical arc so that an enlarged and effective flame front is built up in the combustion chamber to enable all the fuel therein to be burned without detonation, and thereby increase engine performance efficiency and reduce fuel consumption.

Accordingly, a method used to ignite fuel in an internal combustion engine causes an electrical arc to be initiated within the engine's combustion chamber at an optimum static timing angle in advance of top dead center piston position as stroboscopically measured. Such arc is at least 0.1 inch (2.54 millimeters) in length, and may be as long as 1 inch (25.4 millimeters) or even longer. The length of the arc is a direct function of the angular magnitude of the optimum static timing angle and the magnitude of the ignition voltage used, and an inverse function of the magnitude of the pressure in the cylinder of the engine. The optimum static timing angle is that advanced static angle to which an additional advance of 0.5 degrees with respect to top dead center piston position as stroboscopically measured, would cause detonation of the fuel in the combustion chamber of the engine and in the cylinder or cylinders of such engine. The arc developed may be sustained over periods ranging between 0.1 to 30 milliseconds. In modulating the primary winding current of the ignition transformer with AC power, the ignition voltage across the ignition transformer secondary winding is increased and the current in the electrical arc is increased to raise the energy content of the electrical arc.

BEST MODE FOR CARRYING OUT THE INVENTION

Figure 1:
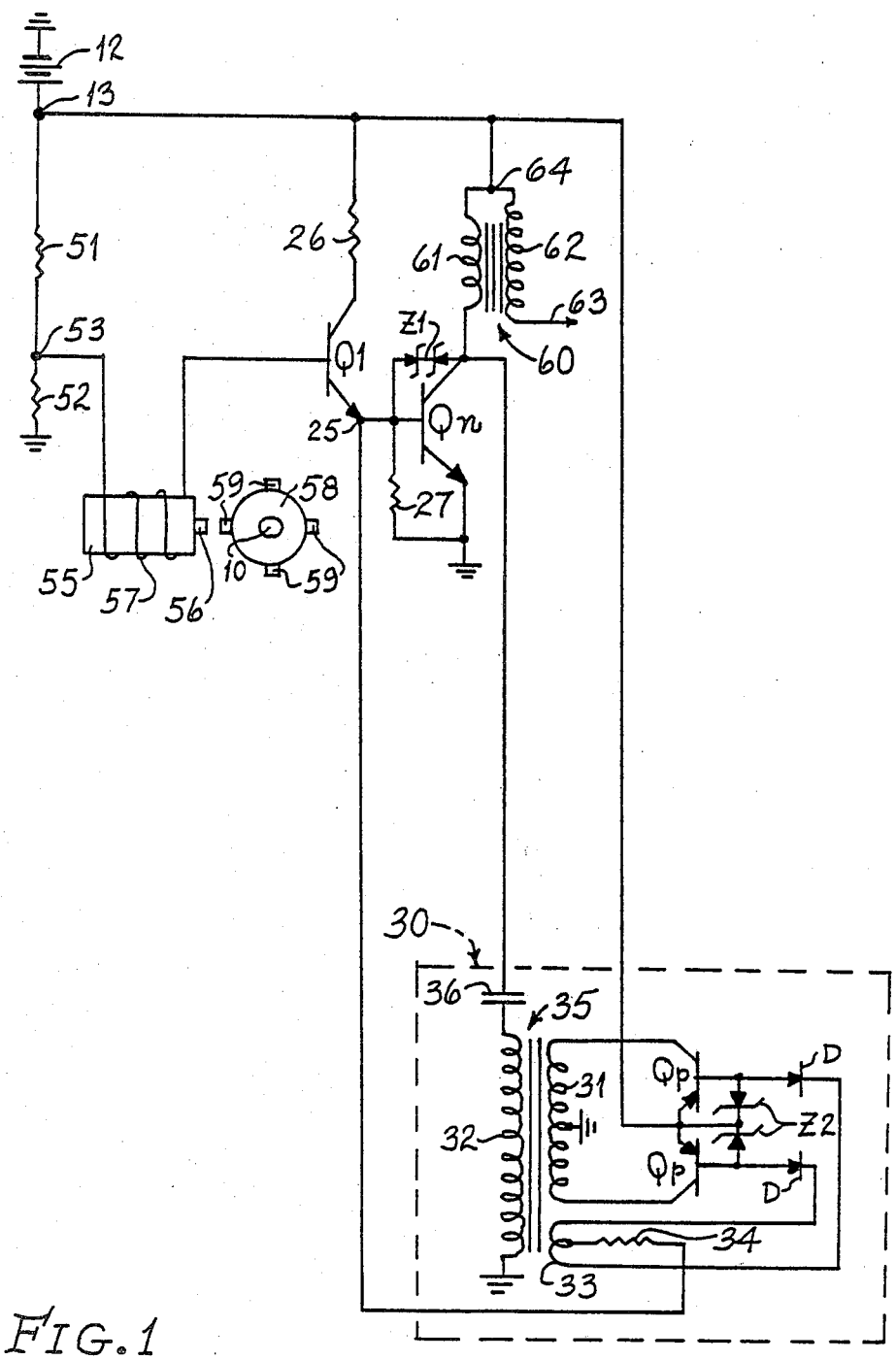
FIG. 1 is an electrical schematic of an ignition system with modulation in accordance with this invention.

Referring to FIG. 1, an ignition system delivering large quantities of electrical energy to an igniter or igniters in a fuel combustion engine, employs novel technical principles to establish ignition current. Such system is basically simple in its configuration, utilizing a minimum number of electronic components and highly effective as well as reliable in its operation.

In this system, the conventional ground symbol in the drawings refers throughout this specification to negative battery potential which is the zero reference level for DC or AC voltages or currents, and is also the signal return path for all electrical signals.

Battery 12 provides DC power from its positive terminal 13 to a timer, to primary winding 61 of ignition transformer 60, to alternating current modulation source 30 and to the electronic switches Q1 and Qn.

The timer consists of a magnetically generating pulse circuit preceding transistor stage Q1, wherein magnetic reluctor wheel 58 is driven by the engine distributor shaft 10. A positive DC potential is provided at junction 13 so that the magnetic pulse timer is powered by DC source 12. A voltage divider resistive network 51 and 52 provides approximately a DC voltage of +1.2 volts between junction 53 and ground to feed coil 57 wound on permanent magnet core 55, by virtue of one end of resistor 51 being connected to junction 13. Core 55 has a magnetic pole piece 56 for enabling magnetic flux to be induced in coil 57 by virtue of magnetic protrusions 59, integral with reluctor wheel 58, being driven past pole piece 56 due to shaft 10 being driven by an engine. The other end of coil 57 is connected to the base of transistor Q1. Transistor Q1 has its collector connected to +DC power at junction 13 via resistor 26. The emitter of Q1 is connected to bias resistor 34 of generator 30, for turning said generator on at the appropriate time to modulate discharge current from winding 61 of ignition transformer 60 during the second mode of operation of the system, during which time winding 61 which had been precharged with DC power during the first mode of operation of this system is now discharged.

Switch Qn is a high voltage, high current semiconductor device with a high DC forward current amplification characteristic, such as a Darlington type transistor.

A high voltage surge protector network Z1 consisting of a bipolar zener diode assembly is connected between the collector of Qn and its base. A low ohmic valued resistor 27 is connected between the base of Qn and its emitter, which emitter is at ground potential. Such protector network limits the voltages between both the collector and base and the collector and emitter of Qn to the zener knee voltage rating of the Z1 assembly, and may be selected to regulate the voltage between the collector and emitter of Qn in the range of 450 to 550 volts, depending upon the particular type of Qn selected, since the present state of the art provides such switch with its high current rating not to exceed the 600 volt limit. Surge protector Z1 may also consist of a suitable voltage rated unipolar zener diode assembly where the cathode of the assembly is connected to the collector of Qn and the anode is connected to the base of Qn.

During the period of the first or charge mode of winding 61 when switches Q1 and Qn are in their conductive states, resistors 26 and 27 also act as a voltage divider network which limits the applied voltage between the base and emitter of Qn not to exceed its maximum rated value for the particular Qn selected.

The collector of Qn is connected to primary winding 61 of transformer 60 and the other side of winding 61 forms a common junction 64 with secondary winding 62 of transformer 60. Junction 64 is connected to junction 13 to enable DC current to flow through winding 61 during the charge or first mode of operation of the system, during which period Qn is turned on and generator 30 is turned off. High voltage lead or cable 63 is normally connected to a rotor of a high voltage distributor when more than one igniter is used in the system, or is connected directly to the igniter when the ignition system comprises only one igniter.

Although not illustrated, it should be understood that distributor shaft 10, coupled to the engine, simultaneously drives reluctor wheel 58 and the rotor of the distributor. The rotor of the distributor is electrically insulated from shaft 10, since shaft 10 is at ground potential.

A rectangular wave AC generator 30 may have one of its output terminals connected to ground, sometimes referred to as zero reference potential since the ground terminal is at the potential of the negative terminal of battery 12. Generator 30 is duty cycled by the timer so that such generator is quiescent during the period when primary winding 61 is being charged and is conductive during discharge periods of winding 61. Since one output terminal of winding 32 is at ground potential, the AC output wave obtained may be referred to as unipolar with respect to such ground reference potential. Such generator is electrically coupled to the collector of Qn and modulates the discharge current from winding 61 during the discharge or second mode of operation of the system, providing a plural number of pulses in the resulting modulation envelope, which plural number of pulses effectively increase the energy level fed to any igniter over a system not employing a modulator. It should be emphasized that although a rectangular wave generator was used in view of its convenience in construction and simplicity of configuration, that any AC generator providing any waveform or even random waves may be used as a modulation source.

This system does not depend upon a capacitor such as capacitor 36 to create ignition oscillation current, inasmuch as this system will function without capacitor 36 being in circuit with winding 32. Generator 30 however shows capacitor 36 connected to winding 32, which capacitor helps transfer the large currents circulating in winding 31 for use in the circuit of winding 32. Transformer 35 such as required in generator 30 is difficult to design due to many non-linear variables involved that affect maximum energy transfer between windings 31 and 32, and it is a simple expedient to obtain high current transfer from winding 31 into winding 32 utilizing capacitor 36.

The basic operation of generator 30 simply is to create oscillation by using winding 33 to feed back a signal to winding 31. This generator is duty cycled on and off by providing a bias voltage intermittently from control point 25 to create a DC bias current in resistor 34, which bias current starts one of stages Qp to oscillate first due to minute dissimilarities in the two transistors Qp. A diode D may be connected in series with each base of transistors Qp in a forward base current direction in order to prevent current from flowing in a direction from the base to the collector of either of transistors Qp, and thereby damaging such transistors. Zener regulation diode pair Z2 is connected between the base of each Qp and its emitter to maintain the base to emitter voltage of Qp below its maximum rated voltage.

Except for a different load at the output winding and the elimination of a capacitor across the battery powering the generator, generator 30 is the same as schematically shown in U.S. Pat. No. 3,841,287 (FIG. 4). Generator 30 is referred to in the art as a Royer oscillator, and a better description of such oscillator operation may be found in technical bulletin TC-101C entitled Tape Wound Cores, published by Arnold Engineering Company of Marengo, Ill., at pages 45 and 46, copyrighted 1978.

The logic of the switching functions of the system may be summarized by the following table:

| Protrusion 59 | Potential at Q1 base | State of Q1 | Potential at Q1 emitter | State of Transistors Qp | State of Qn | Condition of Winding 61 |
|---|---|---|---|---|---|---|
| not driven past pole piece 56 | + | ON | + | OFF | ON | charges |
| driven past pole piece 56 | − | OFF | 0 | ON | OFF | discharges and modulated by output from generator 30 |

Each igniter is modified by removing the gap adjusting member normally attached to the igniter's electrically conductive base. Removal of such gap adjusting member enables a maximum arc gap to be established for any standard igniter so modified in that the electrical arc produced will extend between the firing tip of the axial electrode and the metallic base, or the wall of the combustion chamber in which the igniter is adapted, whichever is closest to the firing tip.

The combustion chamber is normally at the head or top of the cylinder chamber, which cylinder chamber is part of the internal combustion engine, and fuel is injected by the system of the engine into the combustion chamber by means not shown herein, to be compressed by a piston during the compression stroke of the conventional Otto cycle when the piston is driven upward from its bottommost position in the cylinder, to its topmost position at the 0° level, otherwise commonly referred to as top dead center piston position. The optimum timing angle $\theta°$ in advance of top dead center piston position as measured by a stroboscope, is considered as substantially synonymous with the beginning of the electrical arc formation between the firing tip and base of any igniter.

The automotive industry publishes ignition timing angles as stroboscopically measured, and considers such stroboscopically measured timing angles as being the angles at which the electrical ignition arc is initiated within the combustion chamber. Such standards of measurement are resorted to as it would be difficult and impractical to reference ignition timing angles and arc initiation to actual crankshaft angular positions. Such industry standards are adopted herein.

In considering the establishment of the optimum angle $\theta$, it will be necessary to define such angle in terms of the beginning or initiation of electrical arc formation. Although in conventional or non-modulation ignition systems such was not a consideration, the presence of the modulation power from source 30 during the transient discharge of current from primary winding 61 acts to supply ignition power during the entire second mode of operation, which as shown would extend over a period of 2.2 milliseconds for an engine velocity of 3000 revolutions per minute for a 6 cylinder engine.

Without modulator 30 in the system, the conventional Kettering transient current will be delivered to the igniters, the waveform of such Kettering current having substantially one high positive and one high negative excursion, and an electrical ignition voltage sensed by a stroboscopic meter is substantially confined to a small time span, compared with the 2.2 millisecond time span indicated above, and is considered pin-point timewise, so that a unique angle can be stroboscopically measured. With the modulation energy superimposed on the transient discharge current, a band of ignition energy levels will be experienced during the 2.2 millisecond duty cycle period for example. Hence, unless the stroboscope has a built-in differentiation network, the timing angles shown will sweep over a number of degrees of crankshaft angular positions, representing both the beginning and termination of delivered electrical energy to each igniter for each ignition period thereof.

Since the high electrical energy enabled by modulator 30 is desireable for efficient fuel ignition, and consequential more rapid growth of the ignited fuel nodule within the combustion chamber, but imposes difficulty in making stroboscopic angle measurements during the period when the optimum angle $\theta$ is determined, modulator 30 may be disabled by diconnecting DC power feeding same and short-circuiting winding 32. The resultant circuit will be simply a transistorized Kettering circuit, and stroboscopic angular measurements may be taken which provide a substantially pin-point reading at the timing marks on the engine. Such measurements do not require a distinction to be made between the beginning of arc formation and the extinguishing time of such arc in view of the fact that the ignition power is of extremely short duration compared with the 2.2 millisecond duration of the modulated power. There is yet another alternative to stroboscopic measurement techniques, and that is to build in a differentiator into the stroboscope that takes its signal from the leading edge of the ignition waveform, to produce angle information of initiation or the beginning of the electrical arc formation within the combustion chamber. The leading edge of such waveform is important in that it represents the time when the ignited fuel nodule begins to form in the combustion chamber.

Without the modulator in the system, the effective duration of electrical power delivered to the igniter could be in the order of 0.1 to 10 milliseconds, in inverse relationship to the engine speed, and exhibit duty cycles of like time durations. With the modulator in the system the time durations could be extended to as much as 30 milliseconds, particularly where slow engine cranking speeds are involved.

The following table is exemplary of the energy produced by the instant ignition system to feed each igniter, when the engine is producing a velocity of 3000 revolution per minute for a 6 cylinder engine which exhibits a duty cycle of 2.2 milliseconds during which period electrical energy is being fed continuously to an igniter:

| | |
|---|---|
| Peak to Peak Voltage Induced in Primary Winding 61 | 500 volts |
| Peak to Peak Discharge Current Flowing in Winding 61 | 12 amperes |
| Peak to Peak Voltage Induced in Secondary Winding 62 | 40,000 volts |
| Peak to Peak Current Feeding any Igniter | 140 milliamperes |
| Instantaneous Power Fed to Each Igniter During Above duty cycle of 2.2 milliseconds | 5.4 Kilowatts |

Figure 2:
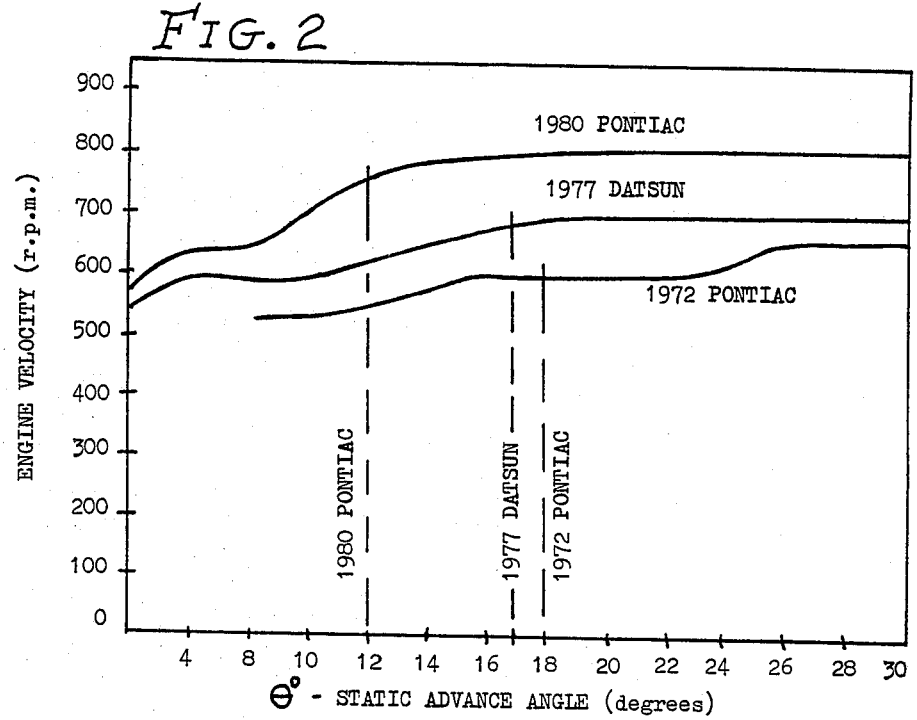
FIG. 2 is a graph of performance curves of static advance angles versus engine velocity for three test vehicles utilized.

Referring to FIGS. 1 and 2, the optimum static timing angle of $\theta°$ in advance of top dead center piston position during the compression stroke of the Otto cycle of the engine, is established by means of a stroboscope. The vacuum advance mechanism is disabled by removing the vacuum line therefrom and plugging up such line during the period when such angle is determined. The centrifugal advance mechanism should be inoperative during such angular determination in order to find the degree setting of the distributor for the static angle of advance before top dead center piston position. Such angle $\theta°$ is considered as the angle at which the electrical arc is initiated at engine idle speeds with the engine at normal operating temperature and the transmission in its drive gear position. The table below provides the manufacturer's specifications for each of three vehicles for which the optimum timing angle $\theta°$ had been determined by stroboscopic measurement.

The 1977 Datsun was adjusted at the recommended idle speed of 650 revolutions per minute, which speed represented a one degree advance due to the centrifugal mechanism starting to operate at 600 revolutions per minute. Although the stroboscopically measured angle was 18° for the Datsun, the actual static advance angle was 17°, as shown in FIG. 2 subtracting the one-degree advance contributed by the centrifugal advance mechanism action.

The centrifugal advance mechanisms in the 1980 and 1972 Pontiac vehicles do not become activated during idle speeds and hence it is possible to obtain the optimum angular static settings for these vehicles as shown by FIG. 2, of 12° and 18° respectively, as stroboscopically measured, without disabling such centrifugal advance mechanisms. On the other hand, there was no need for disabling the centrifugal advance mechanism in the Datsun vehicle since it contributed only a one-degree advance over the stroboscopically measured angle. In all instances the vacuum advance mechanism was disabled during the procedure of determining the static advance angle $\theta$, and such vacuum advance mechanisms were again made operative after such static advance angle determination.

| Vehicle Parameter | Manufacturer's Specifications | | |
|---|---|---|---|
| | 1980 Pontiac, Phoenix, 4 cyl. 2.5 Liter displacement with automatic transmission | 1977 Datsun, Model 810, 6 cyl. 2.4 Liter displacement with automatic transmission | 1972 Pontiac, 8 cyl., 400 in$^3$ (6.55 Liter) displacement with automatic transmission |
| Ignition Timing | 10° before top dead center at 650 rpm, with transmission in drive gear | 10° before top dead center at 650 rpm, with transmission in drive gear | 10° before top dead center at 625 rpm, with transmission in drive gear |
| Spark Plug Gap | 0.060 inches (1.5 mm) | 0.040 inches (1 mm) | 0.035 inches (0.9 mm) |
| Compression Ratio | 8.3 | 8.6 | 8 |
| Compression Pressures | 140 psi (9.8 Kg/cm$^2$) at 160 rpm | 164 psi (11.5 Kg/cm$^2$) at 300 rpm 185 psi (13 Kg/cm$^2$) at 400 rpm | not available |
| Centrifugal Advance | starts at 1050 rpm; full distributor advance of 23° at 4000 rpm | starts at 600 rpm; full distributor advance of 8.5° at 1250 rpm | starts at 700 rpm; full distributor advance of 13° at 2300 rpm |
| Vacuum Advance | starts at 102 mm of Hg (4 inches); full advance of 21° at 230 mm of Hg (9 inches) | starts at 200 mm of Hg (7.87 inches); full advance of 7.5° at 350 mm of Hg (13.78 inches) | starts at 180 mm of Hg (7 inches); full advance of 10° at 380 mm of Hg (15 inches) |

Inspection of the curves of FIG. 2, shows some increase in engine revolutions per minute with the establishment of the optimum advanced static angle $\theta$ as compared with the engine speed when the ignition timing is set to manufacturer's specifications. The 1980 Pontiac and the Datsun vehicles showed a greater speed increase as compared with the 1972 Pontiac vehicle.

It should be emphasized that the optimum angle $\theta$ of 12° for the 1980 Pontiac, the optimum angle of 17° for the 1977 Datsun and the optimum angle of 18° for the 1972 Pontiac represent stroboscopically measured static timing angles in advance of top dead center (0°) piston position, and that such angles are approximately one-half a degree retarded from the angles at which detonation or engine knock begins. Accordingly, for the 1980 Pontiac, detonation began at a stroboscopically measured static angle of 12.5° in advance of top dead center piston position. For the 1977 Datsun, detonation began at a static angle stroboscopically set to 17.5 degrees taking into consideration the one-degree advance produced by the centrifugal advance mechanism at the particular engine speed at which the angle was measured. For the 1972 Pontiac, detonation began at a static angle of 18.5° as stroboscopically measured in advance of top dead center piston position. Consequently, all engines were adjusted so that their respective static advance angles were just out of the zones of detonation but were borderline close to such zones to afford the maximum possible arc length, as will be discussed in conjunction with FIG. 3 below.

A brief discussion of the burning fuel nodule initiation and flame front expansion in conjunction with detonation or knock phenomena will lead to appreciation of the subtle advances provided by this invention.

To understand the phenomenon known as detonation or knock, it is advisable to consider the manner in which the flame spreads from the igniter base to the furthermost point of the combustion chamber. At first, after the ignition of the small amount of fuel mixture close to the igniter base, burning is relatively slow and depends mainly upon the speed at which the unburned fuel mass is brought into contact with the expanding burning fuel nodule. Without violent agitation, or turbulence in the fuel, combustion would be too slow and if it were possible to make the fuel perfectly quiescent, only a small fraction of the total fuel mass would be burned before the opening of the exhaust valve. Turbulence is present in varying degrees in all piston engines, being a function of the passage of the fuel mass through the relatively small restriction made by the intake valve opening and by the 'squish' effect as the piston reaches top dead center and traps feul between the piston top and portions of the cylinder head. In certain designs of side-valve and in-line overhead valve engines, the clearance between the piston top and a carefully chosen portion of the cylinder head is made small to increase the degree of 'squish' turbulence.

As the rapidly expanding ignited fuel nodule spreads outward from the igniter base, heat is radiated to the unburned portion of the fuel mass ahead of it. This accelerates the rate of burning since less time is wasted in raising the temperature of the unburned fuel mass to the temperature at which combustion takes place. Without such radiation, direct contact of the flame, that is mixing of the unburned and burning fuel mass, would be the only way in which heat would be transferred. All the time that combustion is proceeding, there is an exchange of heat energy throughout the whole combustion chamber. As fast as heat energy is liberated by the chemical reactions between the carbon and hydrogen of the fuel on the one hand and the oxygen of the air on the other hand, the complex reaction which is called burning takes place, so that the heat is spread to the unburned fuel mass and to the walls of the combustion chamber and the piston top. The heat is transferred in two ways, by direct mixing of the flame front with the unburned fuel mass, called convection, and by radiation. During the burning process, this extremely rapid interchange of heat is taking place, the general rise in temperature of the gases while the piston is in proximity of top dead center, causes a rapid rise in pressure. The pressure rise is greatest where the temperature is highest, that is immediately behind the flame front, where combustion is nearing completion. The temperature behind the flame front may be as high as 2000° C., while the unburned fuel will probably be about 500° C. Since by Charles' Law, a rise in temperature at a constant volume, all events occurring within a few degrees of crank-shaft angular motion, produces a rise in pressure, a wave of high pressure will travel outward from the igniter base accompanying the flame front.

Near the end of the combustion process, when nearly all the fuel mass has been burned, the pressure and temperature of the unburned fuel mass can sometimes reach critical values. This can occur despite the continuous loss of heat to the surrounding walls of the engine. If these critical values are reached, this 'end-gas' as it is called, explodes or detonates, the entire volume of fuel and end-gas burning simultaneously. The pressure wave resulting from this detonation in striking the walls of the combustion chamber produces the characteristic metallic noise we call knocking or pinging. A third factor besides temperature and pressure decides whether or not the end-gas will detonate. This factor is time. Certain chemical changes are known to take place in the end-gas before detonation takes place and time is required for these to occur. This is the reason why knocking or detonation occurs more readily at low engine speeds than at high speeds. This is also the reason why it is important to optimize the static advance angle at idling engine speeds, rather than concern oneself with dynamic angles added to the static angles by virtue of operation of the centrifugal advance and/or vacuum advance mechanisms.

Detonation behavior patterns have been optically and photographically studied at the laboratories of General Motors Corporation by building a special engine with a quartz window in proximity of the piston top, through which window high speed photographs were taken. The resultant photographs show the ever expanding ignited fuel nodule during the combustion process across a typical combustion chamber as a function of crankshaft degrees before and after top dead center piston position. The results in a non-detonating situation are substantially different from the results during a situation when denotation is made to occur. The fuel nodule expands regularly and at regular intervals in the non-detonating case during the entire combustion process, whereas in the detonating case the fuel nodule expands in non-linear intervals and the spacing between the expanding fuel nodule or flame front becomes continuously shortened as the combustion process nears its end in the detonation situation.

Figure 3:
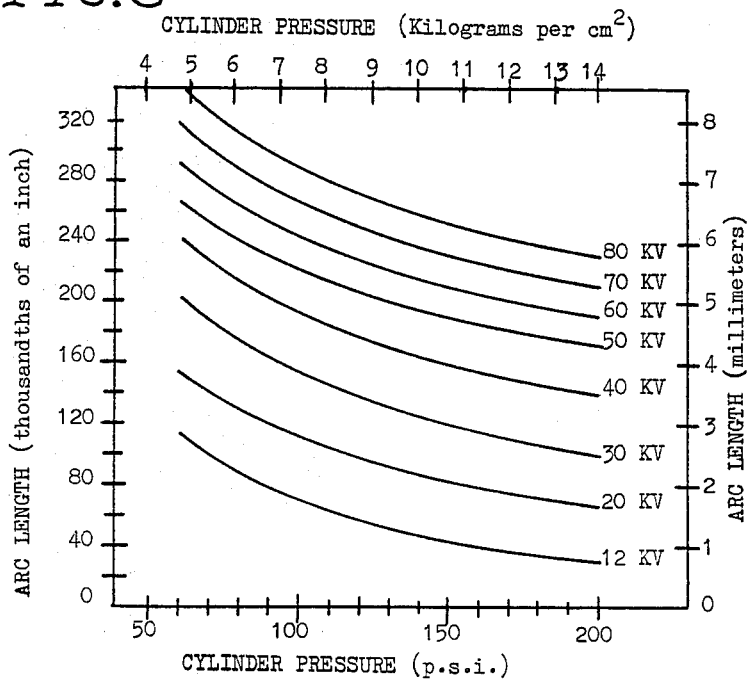
FIG. 3 is a graph of a family of theoretical curves showing the relationship between arc length, cylinder pressure and ignition voltage, usable in conjunction with this invention.

Because of the detrimental effects of detonation at low engine speeds upon the eventual destruction of the engine and in particular the destruction of the pistons, cylinders and valves thereof, consideration is given to establishment of a static timing angle in advance of top dead center piston position that is not as large in angular degrees as might be desired, to enable initiation of the longest possible ignition arc for the particular magnitudes of ignition voltage as dictated by the family of theoretical curves shown in FIG. 3. Such theoretical ignition voltage, cylinder pressure and arc length relationships are therefore limited by the static angular position, as stroboscopically determined, at which the igniter is excited with electrical power, wherein such static angle is just outside the zone of detonation, and therefore represents the optimum static angle for the particular engine. It should be noted that different engines, may, due their different internal configurations, call for different optimum static angles.

Referring to FIGS. 1, 2 and 3, and more specifically to FIG. 3, the family of theoretical curves relate the arc length obtainable as an inverse function of cylinder pressure and as a direct function of igniter voltage magnitude. These relationships are non-linear and hence constants of proportionality between any two of these parameters cannot be established. Although cylinder pressures may vary in a non-linear manner with piston travel or advanced angle of piston position before top dead center during the combustion cycle and during the development of the ignited fuel nodule and flame front, as discussed above in conjunction with detonation principles, the angular magnitude of the advanced angle $\theta°$ also bears an inverse relationship to the cylinder pressure and ignition voltage magnitude, and a direct relationship to the arc length possible of achievement.

In using the theoretical curves of FIG. 3, it is possible to obtain a first order approximation of the arc length for a given engine in terms of the ignition voltage magnitude and typical cylinder pressure.

Several examples of the use of the curves of FIG. 3 may be illustrated by placing a straight edge along a vertical line of a selected constant cylinder pressure that intersects the family of ignition voltages, and running horizontal lines from such intersecting points to the arc length ordinate in order to read the length of arc that will be supported by the particular combinations of ignition voltage and cylinder pressure level.

Tabular results will be obtained for two ignition voltage magnitudes commonly used, namely 30 Kilovolts and 40 Kilovolts, and several pressure levels normally encountered in an engine cylinder before arc initiation, to illustrate several exemplary situations wherein the curves of FIG. 3 are usable as follows:

| Ignition Voltage Magnitude (KV) | Cylinder Pressure | | Arc Length | |
|---|---|---|---|---|
| | p.s.i. | Kg/cm$^2$ | thousandths of an inch | millimeters |
| 30 | 140 | 9.9 | 120 | 3.0 |
| 30 | 120 | 8.4 | 140 | 3.6 |
| 30 | 100 | 7.0 | 150 | 3.8 |
| 40 | 140 | 9.9 | 160 | 4.0 |
| 40 | 120 | 8.4 | 180 | 4.6 |
| 40 | 100 | 7.0 | 195 | 5.0 |

In terms of the vehicles tested, the 1980 Pontiac uses a 32 KV ignition voltage and exhibits 140 p.s.i. (9.9 Kg/cm$^2$) cylinder pressure, which according to the theoretical curves would support an arc length slightly longer than 0.120 inches (3 millimeters). It has however before found that an igniter modified as indicated above and having an electrode spacing of 0.180 inches (4.6 millimeters) was installed in the engine with excellent performance, where angle $\theta = 12°$ and where the zone of angular advance beginning with 12.5° and greater resulted in detonation for this particular engine. But with $\theta = 12°$, no detonation was exhibited even after the vacuum advance mechanism is made operative and the vehicle is driven at both low and high speeds. Also, no detonation was exhibited at the 12° advance angle when running a typical engine stall test, wherein said engine is under the heaviest possible load conditions. As a side issue, the acceleration improved dramatically with particular arc length and static advance angle used. Whereas, when the engine was adjusted to the manufacturer's specifications at an angle $\theta = 10°$ before top dead center piston position and an igniter arc length provided by means of the specified gap of 0.060 inches (1.5 mm), the engine was sluggish with comparatively little power, particularly in an uphill climb of even a 6° slope.

The 1977 Datsun is believed to use a 30 KV ignition voltage, but no information is available in the detailed service manual for this vehicle as to the ignition voltage used. The applied criteria however resulted in using an igniter with gap spacing of 0.195 inches (5 millimeters), and an advanced static angle $\theta=17°$ before top dead center piston position. Again, after reconnecting the vacuum line to the vacuum advance mechanism, actual tests showed that the 17° static advance angle was only 0.5° removed from the zone of detonation, that is detonation ensued when $\theta$ was set to 17.5° or to a larger advanced static angle. The improvement in performance of this vehicle was even more dramatic in terms of acceleration than the 1980 Pontiac. Additionally, the change from the manufacturer's timing angle of 10° before top dead center and from the 0.040 inch (1 millimeter) igniter gap to the 0.195 inch (5 millmeter) igniter gap to multiply the arc length by a factor of 5 and the additional 7° of static angular advance, resulted also in about a 22% fuel consuption efficiency increase in addition to the increased motive power.

The 1972 Pontiac is believed to use a 20 or 25 KV ignition voltage, such ignition voltage not being provided in the service manual for this automobile. This automobile was adjusted in accordance with the foregoing criteria using the 20 KV curve and the 120 p.s.i. (8.4 Kg/cm$^2$) pressure value for the cylinder based on the stated compression ratio of 8 for this vehicle engine. Utilizing the curves of FIG. 3, an arc length of 0.090 inches (2.3 millimeters) was indicated. It was decided to modify the igniters normally used for that engine by removing their gap adjusters, resulting in an arc length capability of 0.120 inches (3 millimeters). Using such modified igniter, and applying the detonation principles, the optimum static angle $\theta$ was found to be 18° before top dead center piston position, as stroboscopically determined. In this instance the zone of denotation was present at $\theta=18.5°$ or greater in advance of top dead center piston postion. This vehicle also exhibited a great increase in motive power, acceleration and also a fuel conservation of 33% as compared to fuel usage prior to the change made in accordance with the principles of this invention.

Although the foregoing treatment and criteria revolved about a variation in ignition voltage magnitudes, cylinder pressures, advanced static angles out of the detonation range but in close proximity thereto in the order of 0.5°, and igniter arc lengths, yet another factor may be added to the foregoing treatment and critieria as briefly touched upon in conjunction with the discussion of the high energy system shown in FIG. 1. Utilizing the system of FIG. 1, or a like high energy system, would further improve the performance and fuel economy of the internal combustion engine. The added factors provided by such high energy system is the very high ignition currents produced thereby coupled with the increased duty cycles during which ignition power is fed constantly to the igniters. The high currents and increased duty cycles would enable an increase in the volume of ignited fuel nodule at the time of its initiation, and the sustained high current over the ignition period would enable such fuel nodule and resultant flame front to grow at a more raid rate. The result would be still greater motive power produced by the engine and a further decrease in fuel consumption. Use of such high power system could easily support ignition arcs of 1 inch (25.4 millimeters) or greater in length, if the engine manufacturer would make igniters of appropriate base diameters available. Such long arcs as would be produced by these igniters could readily change the optimum advanced static angle $\theta$ to still greater advanced angles beyond those illustrated for the automobiles tested, as above discussed, without operating within the zones of detonation, to further effect increase in engine performance and decrease in fuel consumption.

With respect to longer arc length data, it is obvious that FIG. 3 family of curves could be extended by curve fitting extrapolation methods or by obtaining actual data so that the arc length ordinate would read to include arc lengths of 1 inch (25.4 millimeters) or even greater lengths. The cylinder pressure ordinate could likewise be lengthened to include lower pressure levels so that a set of coordinate points of arc length versus cylinder pressure could be determined for each ignition voltage magnitude. A logical conclusion from the extension of the FIG. 3 family of curves would be that with the extremely long arcs it may be possible to operate at still lower cylinder compression levels, and consequently at still greater optimum static advanced angles $\theta$ which are outside the detonation zones in order to achieve even better engine performance and greater engine efficiency.

It should be kept in mind that at high engine speeds the optimum advanced ignition timing angles are increased by activation of the centrifugal advance mechanism, and at high loads such timing angles are increased by activation of the vacuum advance mechanism as specified by the engine manufacturer, and as given in the Manufacturer's Specifications table, above.

It should be noted that the induced voltage in primary winding 61 could be doubled by shifting the location of capacitor 36 to be positioned between winding 32 and ground and by connecting the collector of Qn to the junction of capacitor 36 and winding 32. With such change in FIG. 1, winding 32 will also be charged with DC power during the first mode of operation and discharged during the second mode to enable 1000 volts to be induced in primary winding 61 and consequently 80,000 volts in secondary winding 62 of ignition transformer 60. Hence, the 80 KV ignition voltage magnitude shown in the family of curves of FIG. 3 will be provided.

I claim:

1. A method of starting fuel ignition in an internal combustion engine during compression stroke of a piston in said engine at a static timing angle in advance of top dead center position of said piston as stroboscopically measured, comprising in combination the steps of:
    (a) electrically energizing an igniter at said static timing angle within the zone of non-detonation of said fuel, said static timing angle being within one degree from the boundary between the zones of detonation and non-detonation; and
    (b) creating an electrical arc at the base of said igniter within the internal combustion engine wherein the magnitude of the length of said arc is directly related to the angular magnitude of the static timing angle, concurrently with step (a), the greater the angular magnitude the longer the length of arc capable of being created, and wherein the ignition voltage waveform amplitude is at a realtively constant level for any said static angle magnitude.

2. A method of starting fuel ignition in an internal combustion engine during compression stroke of a piston in said engine at a static timing angle in advance of top dead center position of said piston as stroboscopically measured, comprising in combination the steps of:
    (a) electrically energizing an igniter at said static timing angle within the zone of non-dentonation of said fuel, said static timing angle being within one degree from the boundary between the zones of detonation and non-detonation; and (b) creating an electrical arc at the base of said igniter within the internal combustion engine wherein the magnitude of the length of said arc is directly related to the angular magnitude of the static timing angle, concurrently with step (a), and wherein the ignition voltage waveform amplitude is at a relatively constant level for any said static angle magnitude.

3. The method as stated in claim 2, including the step of:

(c) further advancing said static timing angle of activation of a centrifugal advance mechanism.

4. The method as stated in claim 3, including the step of:

(d) still further advancing said static timing angle by activation of a vacuum advance mechanism.

5. A method of starting fuel ignition in an internal combustion engine during compression stroke of a piston in said engine at a static timing angle in advance of top dead center position of said piston as stroboscopically measured, comprising in combination the steps of:

(a) electrically energizing an igniter at said static timing angle within the zone of non-detonation of said fuel, said static timing angle being located in proximity of the boundary between the zones of detonation and non-detonation; and (b) creating an electrical arc at the base of said igniter within the internal combustion engine wherein the magnitude of the length of said arc is directly related to the angular magnitude of the static timing angle, concurrently with step (a), the greater the angular magnitude the longer the length of arc capable of being created, and wherein the ignition voltage waveform amplitude is at a relatively constant level for any said static angle magnitude, and establishing an electrical arc having a length of at least 0.1 inches.

6. A method of starting fuel ignition in an internal combustion engine during compression stroke of a piston in said engine at a static timing angle in advance of top dead center position of said piston as stroboscopically measured, comprising in combination the steps of:

(a) electrically energizing an igniter at said static timing angle within the zone of non-detonation of said fuel, said static timing angle being located in proximity of the boundary between the zones of detonation and non-detonation;

(b) creating an electrical arc at the base of said igniter within the internal combustion engine wherein the magnitude of the length of said arc is directly related to the angular magnitude of the static timing angle, concurrently with step (a), the greater the angular magnitude the longer the length of arc capable of being created, and wherein the ignition voltage amplitude is at a relatively constant level for any said static angle magnitude, and establishing an electrical arc having a length of at least 0.1 inches; and (c) further advancing said static timing angle by activation of a centrifugal advance mechanism.

7. A method of starting fuel ignition in an internal combustion engine during compression stroke of a piston in said engine at a static timing angle in advance of top dead center position of said piston as stroboscopically measured, comprising in combination the steps of:

(a) electrically energizing an igniter at said static timing angle within the zone of non-detonation of said fuel, said static timing angle being at the boundary of the zones of detonation and non-detonation; and (b) creating an electrical arc at the base of said igniter within the internal combustion engine wherein the magnitude of the length of said arc is in direct proportion to the angular magnitude of the static timing angle, concurrently with step (a), and wherein the ignition voltage waveform amplitude is at a relatively constant level for any said static angle magnitude, and wherein the length of said arc is at least 0.1 inches.

8. The method as stated in claim 7, including the step of:

(c) further advancing said static timing angle by activation of a centrifugal advance mechanism.

9. The method as stated in claim 8, including the step of:

(d) still further advancing said static timing angle by activation of a vacuum advance mechanism.

* * * * *